United States Patent [19]

Florence

[11] Patent Number: 5,640,214
[45] Date of Patent: Jun. 17, 1997

[54] PRINTER AND DISPLAY SYSTEMS WITH BIDIRECTIONAL LIGHT COLLECTION STRUCTURES

[75] Inventor: James M. Florence, Richardson, Tex.

[73] Assignee: Texas Instruments Incorporated, Dallas, Tex.

[21] Appl. No.: 315,997

[22] Filed: Sep. 30, 1994

[51] Int. Cl.⁶ .................................................. H04N 9/12
[52] U.S. Cl. .................... 348/743; 348/771; 359/449
[58] Field of Search ........................... 348/771, 739, 348/743, 744, 753, 755, 759, 763, 764, 768, 770, 247, 270, 273; 359/641, 642, 443, 649, 48, 49, 298, 629, 850, 449

[56] References Cited

U.S. PATENT DOCUMENTS

| | | | |
|---|---|---|---|
| 3,001,447 | 9/1961 | Ploke | 88/61 |
| 3,746,911 | 7/1973 | Nathanson et al. | 315/21 |
| 3,886,310 | 5/1975 | Guldberg et al. | 178/7.5 D |
| 3,972,040 | 7/1976 | Hilsum et al. | 340/324 M |
| 4,036,553 | 7/1977 | Borel et al. | 350/160 |
| 4,087,810 | 5/1978 | Hung et al. | 340/324 M |
| 4,151,549 | 4/1979 | Bautze | 358/3 |
| 4,337,759 | 7/1982 | Popovich et al. | 126/438 |
| 4,403,248 | 9/1983 | Te Velde | 358/62 |
| 4,430,648 | 2/1984 | Togashi et al. | 340/718 |
| 4,441,791 | 4/1984 | Hornbeck | 350/360 |
| 4,638,309 | 1/1987 | Ott | 340/752 |
| 4,680,579 | 7/1987 | Ott | 348/771 |
| 4,739,396 | 4/1988 | Hyatt | 348/751 |
| 4,854,669 | 8/1989 | Bimbach et al. | 350/162.12 |
| 4,879,602 | 11/1989 | Glenn | 358/233 |
| 4,969,730 | 11/1990 | van den Brandt | 353/31 |
| 5,061,049 | 10/1991 | Hornbeck | 359/224 |
| 5,079,544 | 1/1992 | DeMond et al. | 340/701 |
| 5,083,857 | 1/1992 | Hornbeck | 359/291 |
| 5,096,279 | 3/1992 | Hornbeck et al. | 359/230 |
| 5,101,236 | 3/1992 | Nelson et al. | 355/229 |
| 5,172,161 | 12/1992 | Nelson | 355/200 |
| 5,212,555 | 5/1993 | Stoltz | 358/206 |
| 5,339,116 | 8/1994 | Urbanus et al. | 348/716 |
| 5,386,250 | 1/1995 | Guerinot | 348/755 |
| 5,387,929 | 2/1995 | Collier | 348/97 |
| 5,428,408 | 6/1995 | Stanton | 348/742 |

*Primary Examiner*—Victor R. Kostak
*Attorney, Agent, or Firm*—Ira S. Matsil; James C. Kesterson; Richard L. Donaldson

[57] ABSTRACT

An optical system for directing light to a spatial light modulator 16 (e.g., a digital micro-mirror device) is disclosed herein. This system can be used with displays, printers or cameras. The system includes a first light generating apparatus 30a for generating a first beam of light and a second light generating apparatus 30b for generating a second beam of light. A first lens 36a directs the first beam of light toward the spatial light modulator 16 at a first angle. Also, a second lens 36b directs the second beam toward the spatial light modulator 16 at a second angle. The system also includes an apparatus 34 which redirects either the first or the second beam of light away from the spatial light modulator 16.

19 Claims, 11 Drawing Sheets

PRINTER AND DISPLAY SYSTEMS WITH BIDIRECTIONAL LIGHT COLLECTION STRUCTURES

CROSS-REFERENCE TO RELATED APPLICATIONS

The following patents are hereby incorporated herein by reference:

| Patent No. | Filing Date | Issue Date | TI Case No. |
|---|---|---|---|
| 4,337,759 | 02/27/81 | 07/06/82 | — |
| 5,061,049 | 09/13/90 | 10/29/91 | TI-13173B |
| 5,079,544 | 02/27/89 | 01/07/92 | TI-13978 |
| 5,083,857 | 06/29/90 | 01/28/92 | TI-14568 |
| 5,101,236 | 12/21/89 | 03/31/92 | TI-14585 |
| 5,172,161 | 12/31/90 | 12/15/92 | TI-15602 |
| 5,430,524 | 03/28/94 | 07/04/95 | TI-15602AC |

FIELD OF THE INVENTION

This invention generally relates to display and printer systems and specifically to printer and display systems with bidirectional light collection structures.

BACKGROUND OF THE INVENTION

Digital micro-mirror devices (also referred to as deformable mirror devices or simply DMDs) are finding many uses in light deflecting technologies. In operation, the devices are akin to small mirrors which rotate about a fixed axis. The rotation causes light to be deflected under control of the rotation. Thus, in an array of DMDs each device, or pixel, can be selectively rotated thereby patterning light reflected from the array.

Digital micro-mirror devices can be used in a wide variety of applications. These applications include displays such as television (e.g., high definition television), computer monitors and other video displays. An example of a video display system is disclosed in U.S. Pat. No. 5,079,544. The DMDs can also be used in printer applications including printers, photocopiers and facsimile machines. An example of a printer system is disclosed in U.S. Pat. No. 5,101,236. Further, DMDs can be used in other applications including video cameras.

SUMMARY OF THE INVENTION

An optical system for directing light to a spatial light modulator (e.g., a digital micro-mirror device) is disclosed herein. This system can be used with displays, printers or cameras. The system includes a first light generating apparatus for generating a first beam of light and a second light generating apparatus for generating a second beam of light. A first lens directs the first beam of light toward the spatial light modulator at a first angle. Also, a second lens directs the second beam toward the spatial light modulator at a different angle. The system also includes means for redirecting either the first or the second beam of light away from said spatial light modulator.

An advantage of the invention is that it eliminates a problem which can be referred to as "hinge memory." Since light alternatingly impinges the deformable mirror device from both sides, the mirror in each pixel will over time be deformed an equal number of times in each direction. This feature is advantageous because it prevents the mirror element from being naturally biased toward one position over the other.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF ILLUSTRATIVE EMBODIMENTS

The making and use of various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

The following first provides a description of a prior art display system. The operation of an ideal system will be described followed by a description of a problem referred to as hinge memory. A number of variations of the system and method of the present invention which solve this problem will then be described.

The present invention will first be described in the context of display systems. It should be realized, however, that the invention can also be utilized in other systems such as printer or camera systems.

Figure 1:
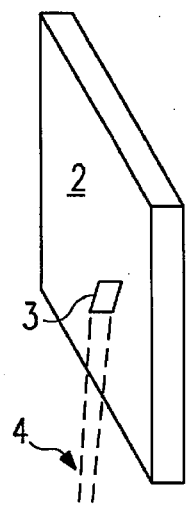
FIG. 1 illustrates a prior art display system.
Figure 1:
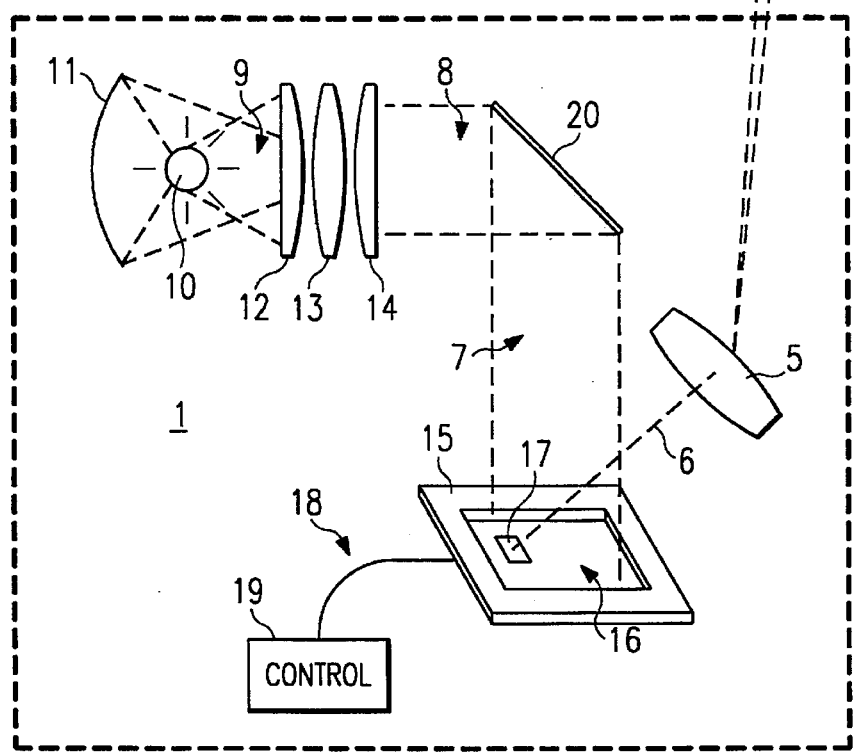

An example of a known display system is shown in prior art FIG. 1. The system of FIG. 1 includes an image generating system 1 and a display screen 2. The display screen may be translucent so as to allow for back projection or reflective so as to allow for front projection. A light source 10 is used to generate light energy 9 for illumination of display screen 2. Light 9 is concentrated and directed toward lens 12 by mirror 11. Lens 12, 13, and 14 form a beam collimator operative to collimate light 9 into a beam of light 8. This is done so as to concentrate the light energy and increase the efficiency of the overall system. Fold mirror 20 is used to direct the collimated light 8 onto a spatial light modulator (SLM) 15 via path 7. The SLM 15 may comprise a digital micro-mirror device. A color filter (not shown) can also be included within path 7 so as to color (e.g., red, green or blue) the light which will be reflected to screen 2.

Spatial light modulator 15 is operative to selectively redirect portions of light from path 7 toward enlarger lens 5 and onto display screen 2 so as to form an image. When digital micro-mirror devices are used, spatial light modulator 15 includes a number of switchable elements (such as 17) on top surface 16. The switchable elements or pixels are selectively controllable to redirect light from path 7 to lens 5 via optical path 6. The light is then directed to a portion 3 of screen 2 via light path 4. The switchable elements 17 may be controlled by control circuit 19 which is coupled to spatial light modulator 15 via bus 18.

Figure 2A:
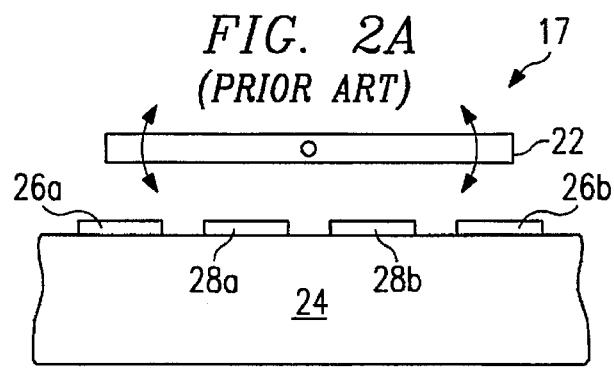
FIG. 2a illustrates a cross-sectional view of a known digital micro-mirror device pixel.

An example of a single pixel 17 is illustrated in FIG. 2a. The pixel includes deformable mirror element 22 which is spaced from substrate 24 by posts (not shown for clarity). Landing electrodes 26a and 26b as well as addressing electrodes 28a and 28b are formed on substrate 24. In operation, the mirror element 22 can deformed such that it contacts one of the landing electrodes 26a or 26b when light is to be directed to screen 2 and the other electrodes 26b or 26a when light is directed away from screen 2. In this manner, each pixel in an array of pixels can be individually controlled to illuminate a corresponding portion of screen 2.

Figure 2B:
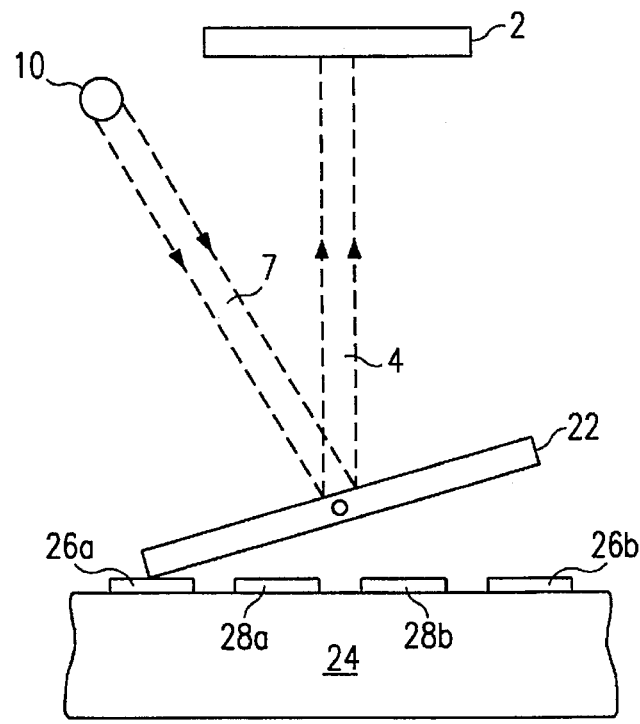
FIGS. 2b and 2c illustrate the operation of the known digital micro-mirror device pixel.
Figure 2C:
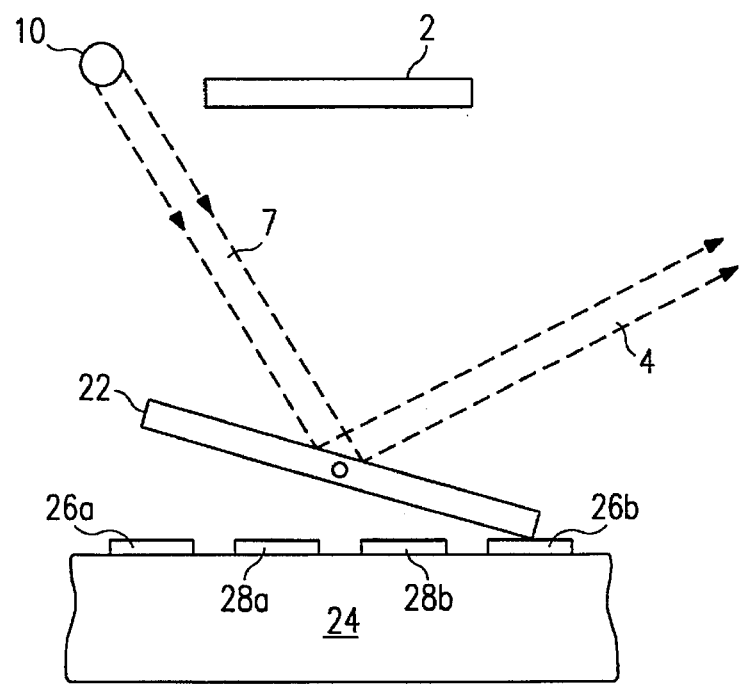

FIGS. 2b and 2c illustrate how the pixel of FIG. 2a can be utilized to selectively control whether light travels to screen 2. In both FIGS. 2b and 2c, light beam 7 travels from light source 10 and impinges mirror element 22. In FIG. 2b, however, the mirror element 22 is deflected so that light is reflected in the direction toward the screen 2. In FIG. 2c, on the other hand, the mirror element 22 is deflected so that light is directed away from screen 2. In this manner, each pixel 17 in an array of pixels 17 can be selectively directed to the screen 2.

In some prior art systems, light of different colors is alternately transmitted to deformable mirror device 16. For example, a system may use combinations of red, green and blue to generate all the colors necessary for a video system. In addition, to control the intensity of the picture displayed, the pixel mirror 22 may reflect light to screen 2 for a portion of the time and away from the screen 2 for another portion of the time. In this manner, the color and intensity of a picture being displayed may be controlled.

Figure 3A:
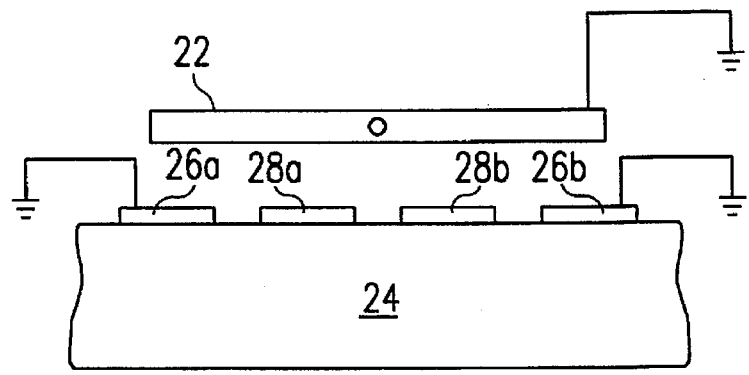
FIGS. 3a-3c illustrate the correct operation of a DMD pixel.
Figure 3B:
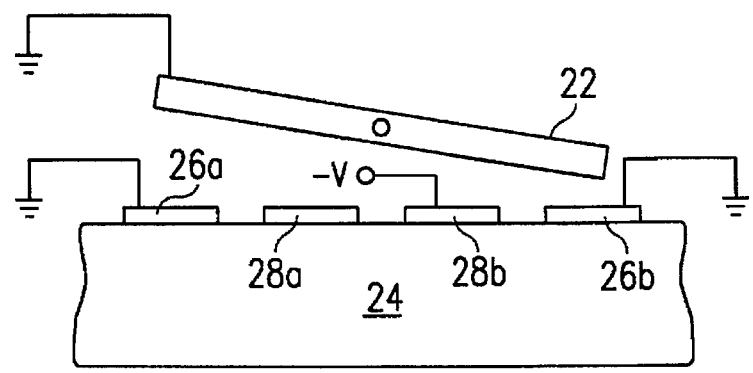
Figure 3C:
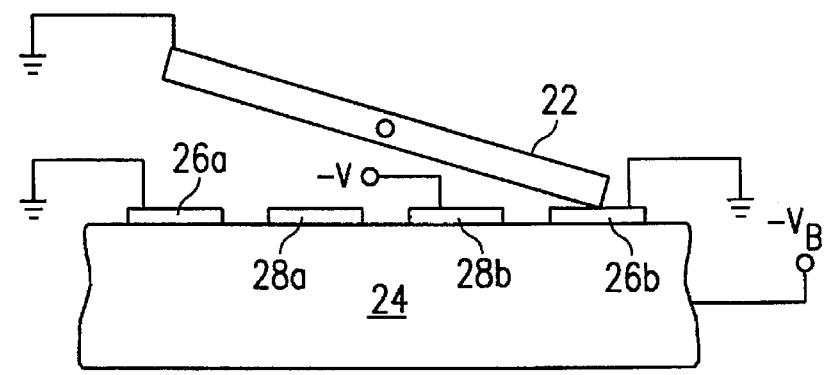

The operation of a properly working pixel is illustrated in FIGS. 3a–3c. Referring first to FIG. 3a, the landing electrodes 26a and 26b as well as mirror element 22 are coupled to a common voltage such as ground. When the pixel 22 is addressed, a voltage, labeled –V in FIG. 3b is applied to one of the address electrodes 28a or 28b. The presence of the voltage –V on the address electrode 28b will cause the mirror element 22 to tilt in the desired direction. As illustrated in FIG. 3c, a bias voltage $-V_B$ is applied to the substrate 24. The application of bias voltage $-V_B$ will cause the mirror element 22 to deform fully and be in physical contact with landing electrode 26b. In this manner, each pixel element can be individually deformed so as to either deflect light towards or away from a display as previously discussed with respect to FIGS. 2a and 2c.

Unfortunately, a problem, which can be referred to as hinge memory, exists in prior art DMD systems. Since most video signals have a larger percentage of low intensity levels than high levels, the pixels in the DMD array tend to tilt more to the OFF state than to the ON state. Over time, the pixels then tend to lean in the OFF state direction. Increasing levels of address and bias voltages must be applied to get the pixels to switch to the ON state. Ultimately, the pixel is unable to be switched to the ON state and a dark defect will appear in a picture being displayed. The problem is not a failure of the hinge. Rather, it is a memory of being constantly tilted in one direction, sometimes for up to 85% to 95% of the time it is operating.

Figure 4A:
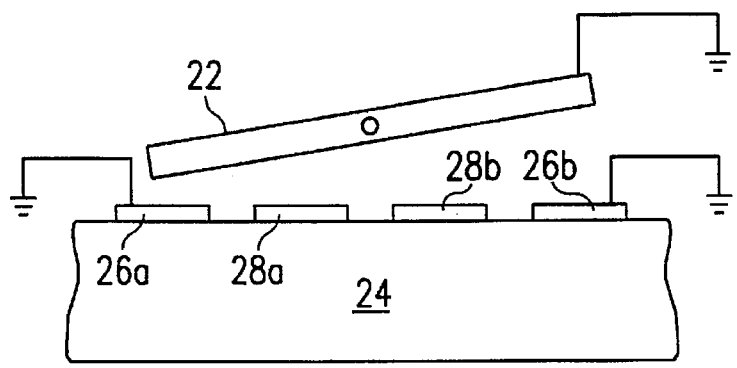
FIGS. 4a-4c illustrate a problem with the operation of the DMD pixel known as hinge memory.
Figure 4B:
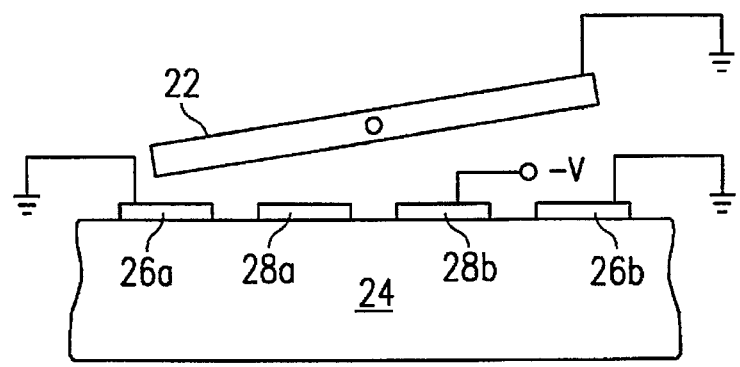
Figure 4C:
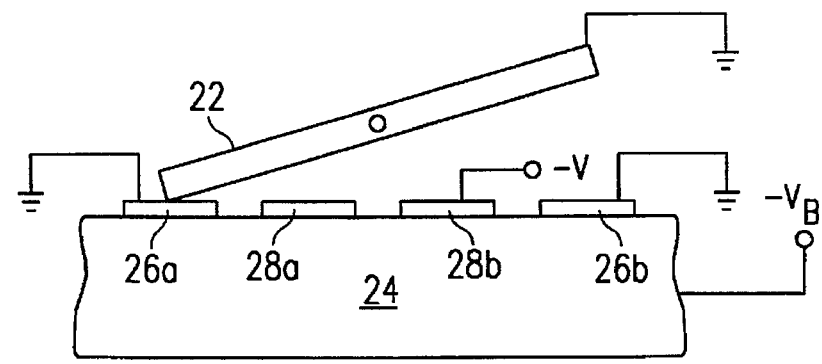

The hinge memory problem can be illustrated by the cross-sectional diagrams in FIGS. 4a and 4c. As illustrated in FIG. 4a, mirror element 22 is tilted toward landing electrode 26a even though no address or bias voltage has been applied. When the address voltage –V is applied to address electrode 28b, as illustrated in FIG. 4b, the mirror element 22 is deflected. However, the mirror element 22 still tilts in the direction of landing electrode 26a, rather than the direction of landing electrode 26b as is desired. Therefore, when the bias voltage $-V_B$ is applied, as in FIG. 4c, the mirror element 22 will be attracted to landing electrode 26a instead of landing electrode 26b. As a result, the mirror element is deflected in the wrong direction.

In one aspect, the present preferred invention provides a system and method for eliminating this hinge memory problem. The hinge memory effect can be essentially eliminated if the pixels can be operated in a mode where they spend approximately half of the time tilted in each direction. This is referred to as a 50/50 tilt. Then, no memory of a preferred tilt direction will build up and the system can be operated with reasonable address voltages –V and $-V_B$.

Figure 5:
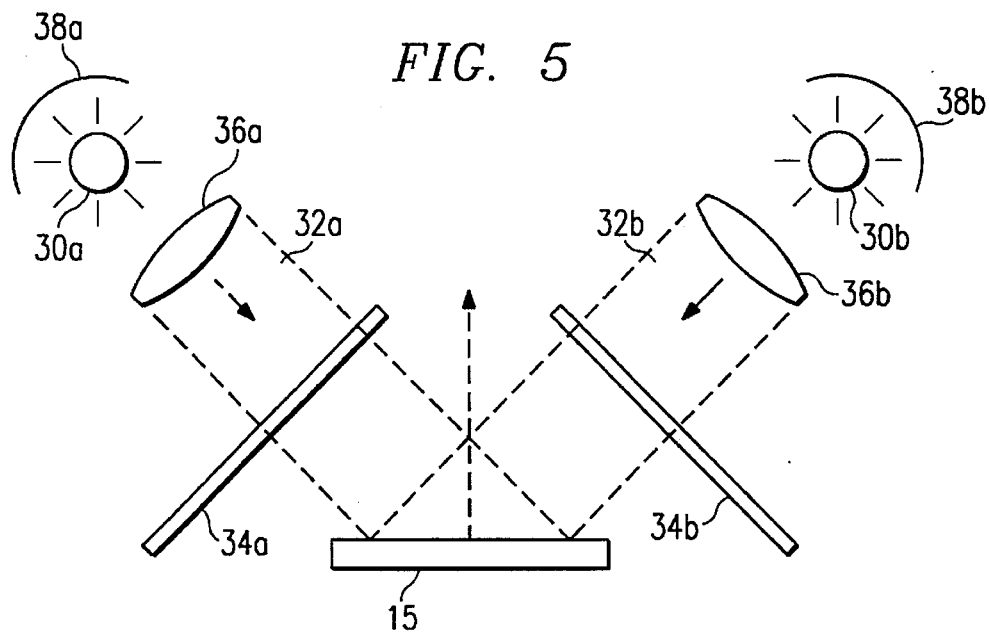
FIG. 5 illustrates a first embodiment system of the present invention.

As illustrated in FIG. 5, one method of implementing the 50/50 flit is to set up a system that illuminates the DMD 15 from two different directions. The two sources 30 and 32 are both set up to illuminate the DMD 15 is a dark field set up, but from opposite sides. In this initial example, the two light generating apparatus are implemented using two separate light sources 30a and 30b. But as will be clear below, a single light source could also be used. A shutter or color wheels 34a and 34b are set up in both illumination paths 32a and 32b and are switched so that DMD 15 is illuminated sequentially first from the light from light source 30 then from the light from light source 32 and then back to light source 30 and so on. By controlling this sequence of illumination paths, the DMD pixels will spend approximately 50% of their time in either tilted state regardless of the intensity value to be displayed.

In operation, light will be generated from first light source 30a as well as first light source 30b. Mirrors 38a and 38b may be optionally included to direct more of the light towards the DMD 15. The light generated by light source 30a will be collimated in collimator 36a and directed towards DMD 15 via light path 32a. Likewise, the light beam generated by light source 30b will be collimator 36b and also directed towards DMD 15 in this case via light path 32b. Color wheels 34a and 34b are included in the light paths 32a and 32b between the collimator 36a or 36b and the DMD 15. The color wheel 34a/34b is provided to produce the correct color (e.g., red, green, or blue) of light to be transmitted to the DMD 15.

Figure 6A:
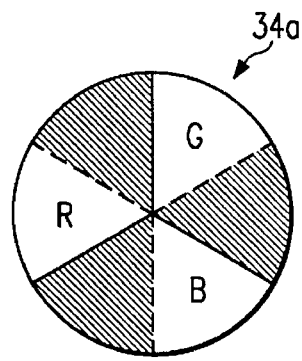
FIG. 6a-6d illustrate exemplary color wheels which may be utilized with the system of FIG. 5.
Figure 6B:
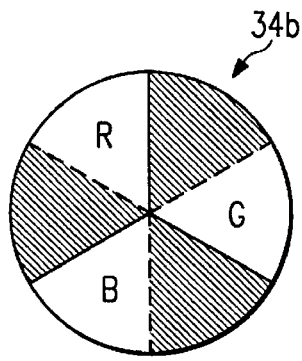

One example of color wheel 34a and 34b is illustrated in FIGS. 6a and 6b. In this case, each color wheel 34a/34b is divided into six sections. Three of the sections include color filters labeled in these figures as R for red, G for green, and B for blue (it is understood other colors could be used). Each of the colored sections R, G, B are separated by an opaque section denoted by the hatched areas. In operation, the two color wheels 34a and 34b will be aligned such that one is passing light while the other one is redirecting the light away from the spatial light modulator 16. In other words, when light passes through filtered areas R, G, and B of color wheel 34a, light will also be redirected (or absorbed) by the corresponding opaque section of color wheel 34b. Generally, when light passes through filtered areas R, G, and B of color wheel 34b, light will also be redirected by the opaque section of color wheel 34a. In the example of FIGS. 6a and 6b, half of the light for each red cycle will be provided by first light source 30a and the other half by second light source 30b.

Figure 6C:
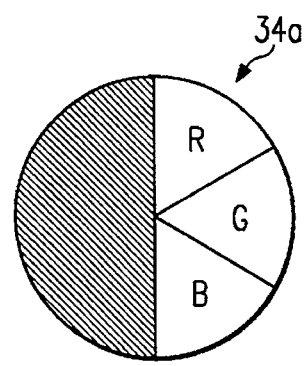
Figure 6D:
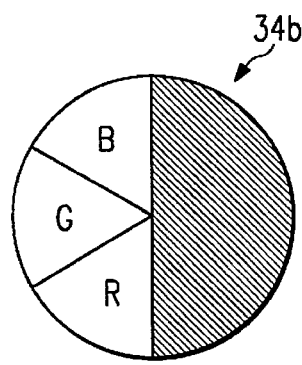

An alternate embodiment is illustrated in FIGS. 6c and 6d. Here, for each full color cycle, e.g., red, green or blue, light is provided from either first light source 30 or second light source 30b, but not both. In this example, each of the color wheels 34a and 34b is opaque in one half and colored in the second half as illustrated in the figures. It should be noted that in the embodiment of FIGS. 6c and 6d, the color wheels 34a and 34b will rotate only half as fast since a full color cycle occurs on half of the wheel as opposed to the full wheel as in the first embodiment.

Figure 7:
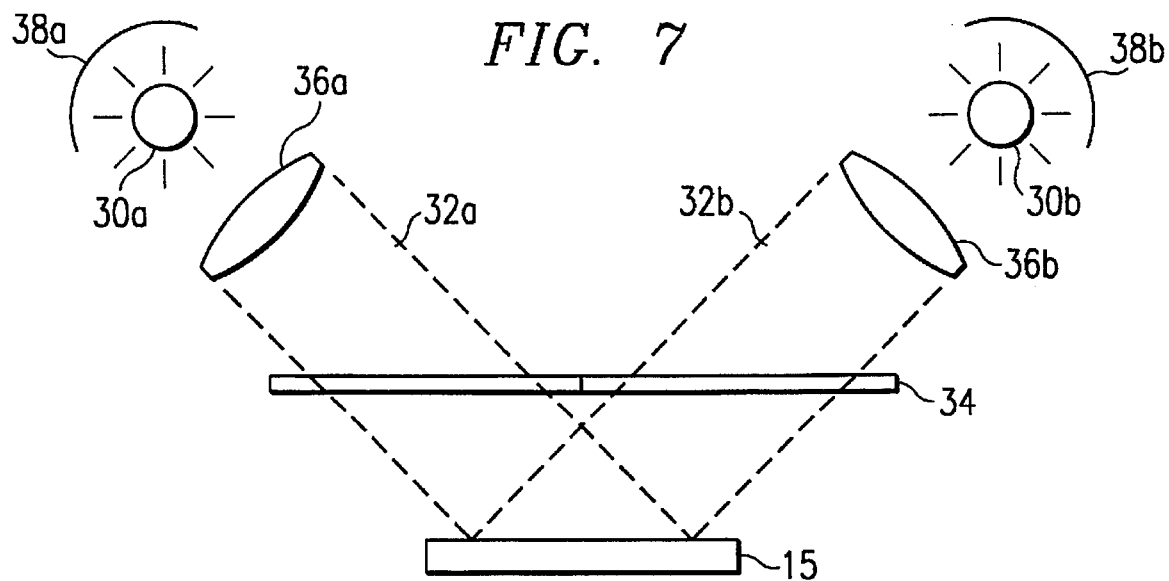
FIG. 7 illustrates an alternate embodiment system of the present invention.
Figure 8A:
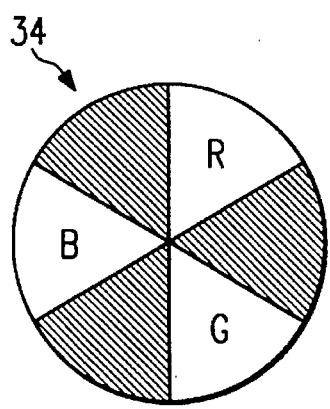
FIGS. 8a and 8b illustrate two exemplarary color wheels which may be utilized in the system of FIG. 7.
Figure 8B:
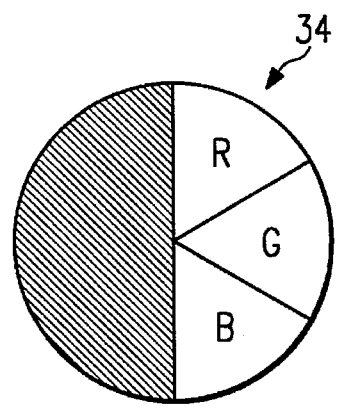

In an alternate embodiment, illustrated in FIG. 7, a single color wheel 34 may be utilized for both the first and second light beams. Examples of two such color wheels 34 are illustrated in FIGS. 8a and 8b. In this case, the color wheels 34 are designed such that only one of the beams from path 32a and 32b is permitted to pass through the color wheel 34 and impinge upon spatial light modulator 16. The other light beam will be redirected away from the spatial light modulator 16.

In the embodiment of FIG. 8a, the color wheel 34 has been partitioned into six equal portions. Each of the colored portions R, B, and G is adjacent two opaque portions (indicated by the hatching). With this embodiment, the light impinging DMD 16 will alternatively be supplied by each light generating apparatus 30a and 30b. In other words, if the color wheel 34 is rotating clockwise, light from light generating apparatus 30a will pass through portion R, then light from light generating apparatus 30b will pass through portion B, then light from the light generating apparatus 30a will pass through portion G, and so on.

An alternate embodiment is illustrated in FIG. 8b. In this case, half the wheel is opaque and the other half is divided into three colored portions R, G, and B. In this embodiment, light from each light generating apparatus 30a and 30b will be transmitted through all three color filters before the light source is switched. Either embodiment of FIG. 8a or FIG. 8b may be utilized so long as the pixel addressing is synchronized.

While FIGS. 8a and 8b illustrate two such color wheels, any configuration of colors can be used so long as only one light beam 32a or 32b is allowed to pass. In other words, any slice of the color wheel may comprise the colored portion so long as the opposing slice is opaque. Of course, it will be necessary to synchronize the pixel addressing with the color wheel such that the spatial light modulator is addressed so as to account for the direction from which light is impinging.

Figure 9:
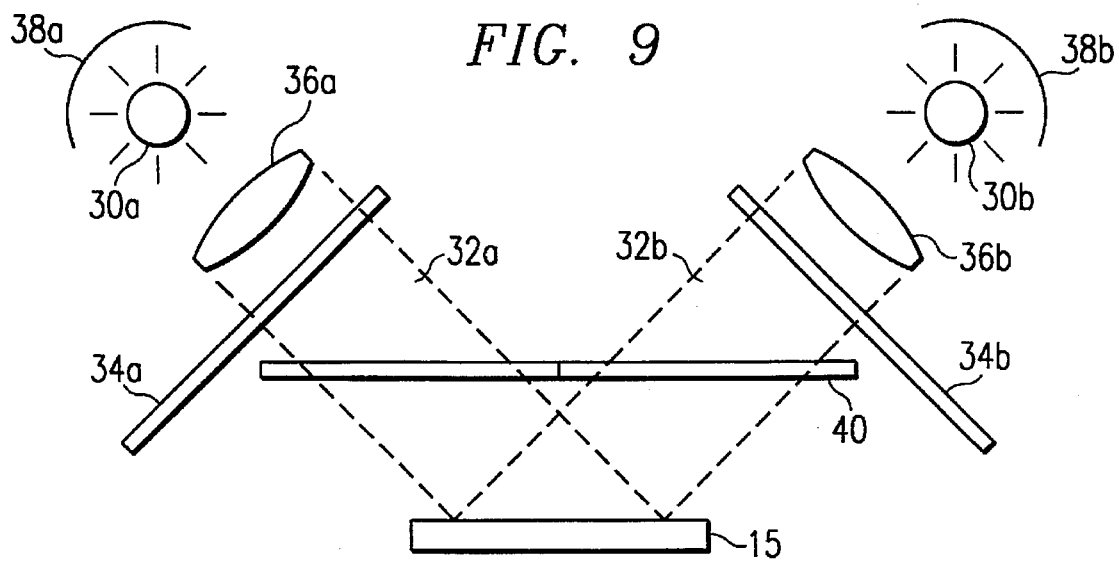
FIG. 9 illustrates an alternate embodiment of the present invention.
Figure 10A:
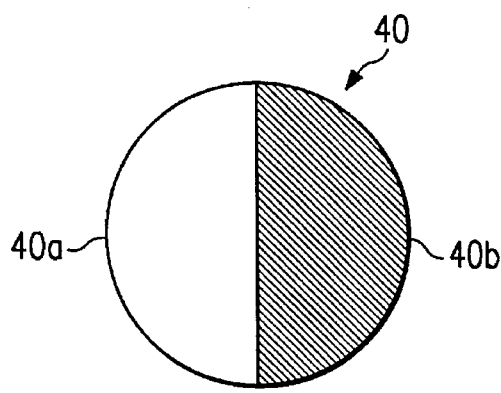
FIG. 10a illustrates a shutter which may be utilized with the system of FIG. 9 and FIGS. 10b and 10c illustrate color wheels which may be utilized with the system of FIG. 9.
Figure 10B:
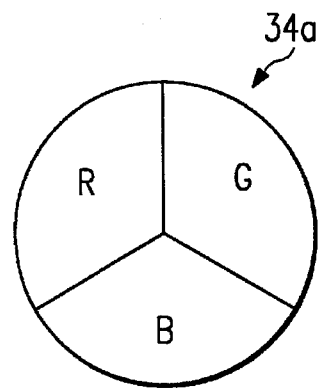
Figure 10C:
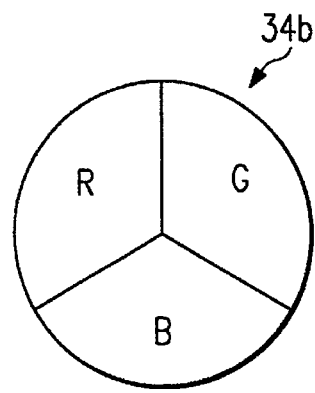

Referring now to FIGS. 9 and 10, the system can be set up with both color wheels 34a and 34b (as illustrated in FIGS. 10b and 10c) and shutter 40, (e.g., as illustrated in. FIG. 10a). In this case, the color wheels 34a and 34b may be identical and do not need to include any opaque portions. The shutter 40 will include a portion 40a which is transparent to light a portion 40b which is opaque. In this manner, light impinging the transparent portion 40a will be allowed to pass through while light impinging the opaque portion 40b will be redirected away from the spatial light modulator 15. Since the shutter 40 will also be spinning, the light which passes through will alternatively come from light source 30a and light source 30b.

In an alternate embodiment, not shown, the color wheels 34a and 34b are replaced with a single color wheel. As an example, a color wheel 34 as shown in FIGS. 10b or 10c could be placed as illustrated in the embodiment of FIG. 7. In this case, the color wheel 34 could be parallel to shutter 40. In one example, the color wheel 34 would rotate twice as fast as shutter 40 so that the light generating apparatus 30a and 30b alternate in providing light for the system.

While the previous embodiments have been described by using two light sources 30a and 30b, the present invention also envisions applications where only a single light source 42 is used. The single light source 42 provides more than one light beam which can be directed so as to impinge the spatial light modulator 15 from different angles. In this manner, a single light source 42 can be used to generate two light generating apparatus 30a and 30b. This solution eliminates the need for two separate light sources 30a and 30b. Of course, an increase in the number of sources would increase the cost of the system. A solution is therefore desired where a single light source 42 can serve both ill-ruination paths 42 as 32a and 32b.

Figure 11:
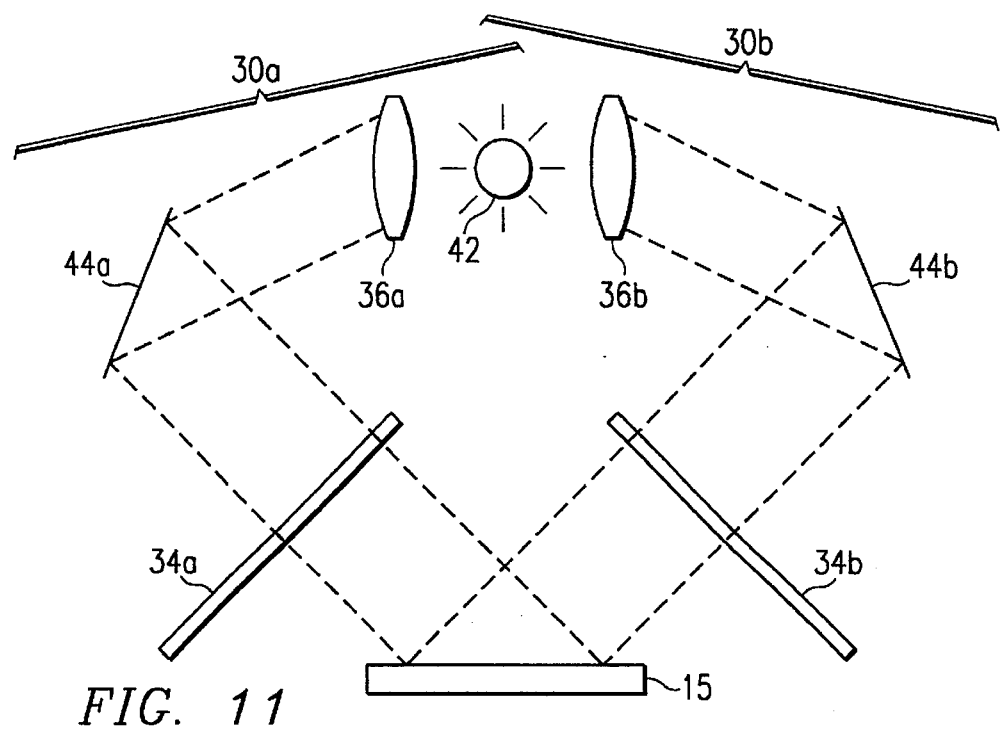
FIG. 11 illustrates a first embodiment system which utilizes a single light source.

A first example using a single light source 42 and mirrors 44a and 44b to accomplish first and second light generating apparatus 30a and 30b is illustrated in FIG. 11. The system of FIG. 11 comprises a single light source 42, which generates light towards first condenser lens 36a and second condenser lens 36b. Light is directed from the condenser lens 36a towards mirror 44a while light from condenser lens 36b is directed towards mirror 44b. The mirrors 44a and 44b are positioned so as to direct the first and second light beams toward spatial light modulator 15. In this example, the first light generating apparatus 30a comprises single light source 42, collimator 36a and mirror 44a while second light generating apparatus 30b comprises light source 42, collimator 36b and mirror 44b.

In the examples illustrated in FIG. 11, color wheels 34a and 34b are included as similar to those illustrated in FIG. 5. However, it should be appreciated that any of the previous embodiments illustrated in FIGS. 5–10 can also be included with this example.

Figure 12:
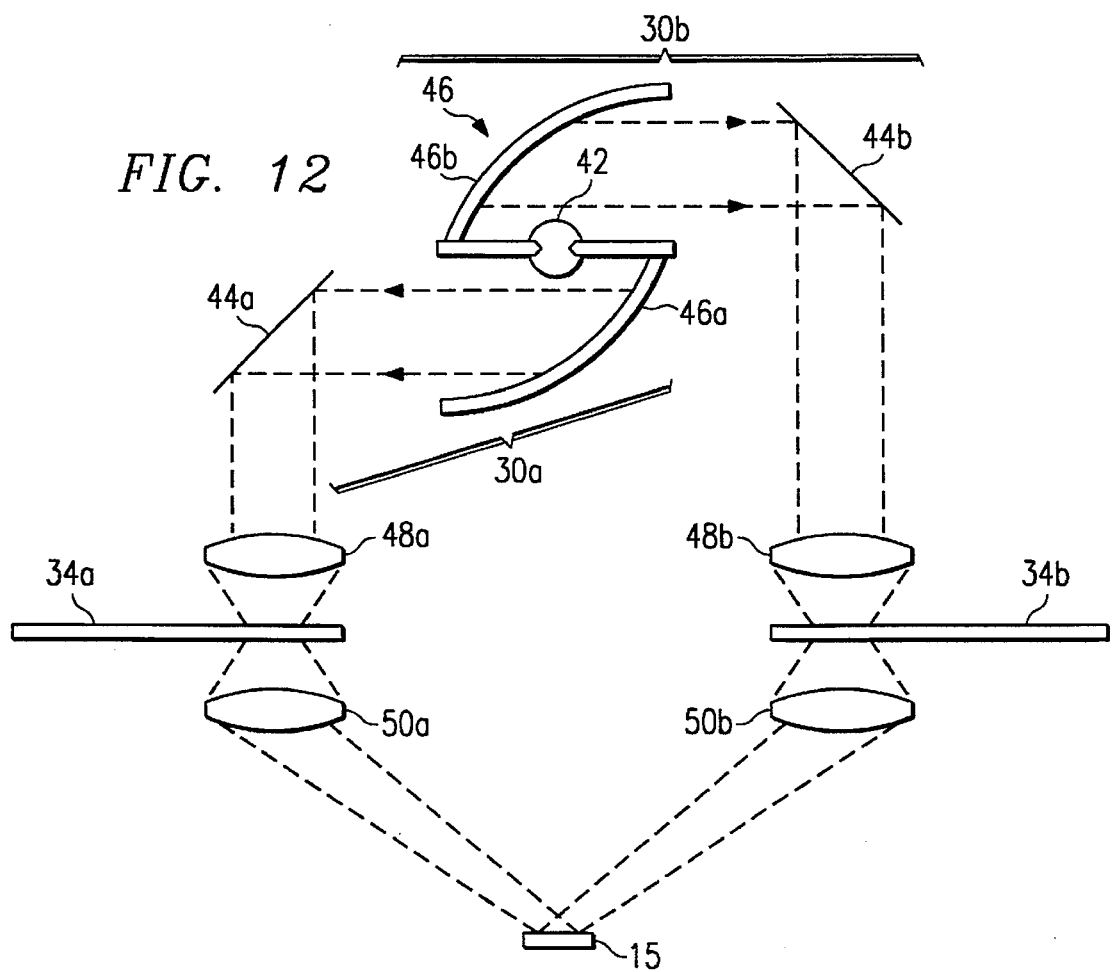
FIG. 12 illustrates an alternate embodiment system which uses a single light source.

Another technique for producing the first and second light generating apparatus 30a and 30b is illustrated in FIG. 12. In this method, a light collector 46 is used. In FIG. 12, the light collector comprises a split parabola 46. This structure should capture 60 to 80% of the light emitted by an arch lamp 42 as is done with standard parabolic collectors. But, by splitting the structure 46 into two half shell parabolas 46a and 46b, the light will be directed in two separate collimated beams. The light collector 46 in this case comprises half shell parabola 46a and half shell parabola 46b. Each of these will generate a collimated beam of light.

The first collimated beam of light will be directed towards mirror 44a which will direct that light towards lens 48a to focus the light on color wheel 34a. The colored light from color wheel 34a will then be directed to lens 50a which can direct the light towards spatial light modulator 15. The second beam of light will travel a similar path from mirror 44b to lens 48b through color wheel 34b to lens 50b and finally to spatial light modulator 15. As with the previous examples, the color wheels 34a and 34b will be designed such that only one of the light beams will be allowed to impinge spatial light modulator 15 at any given time. As also discussed, a shutter (not shown) can be included.

Figure 13:
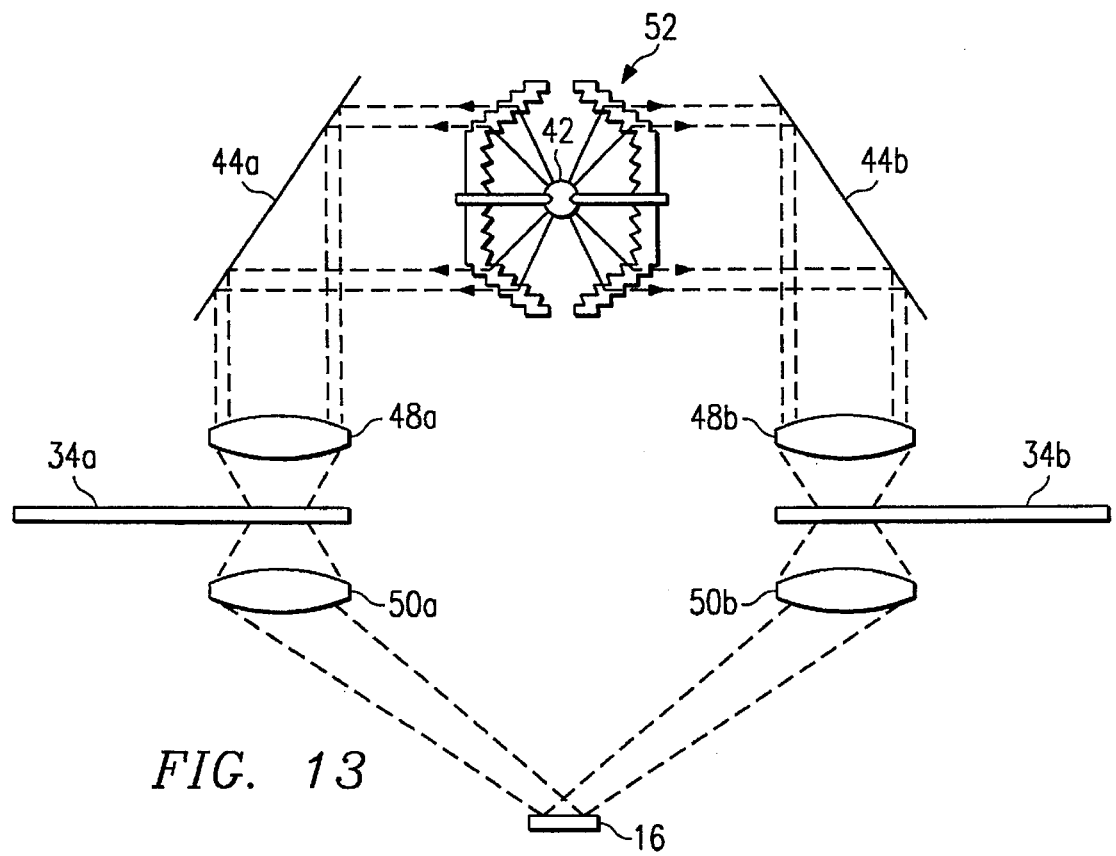
FIGS. 13-15 illustrate total internal reflection structures which may be utilized in the system of the present invention.
Figure 14:
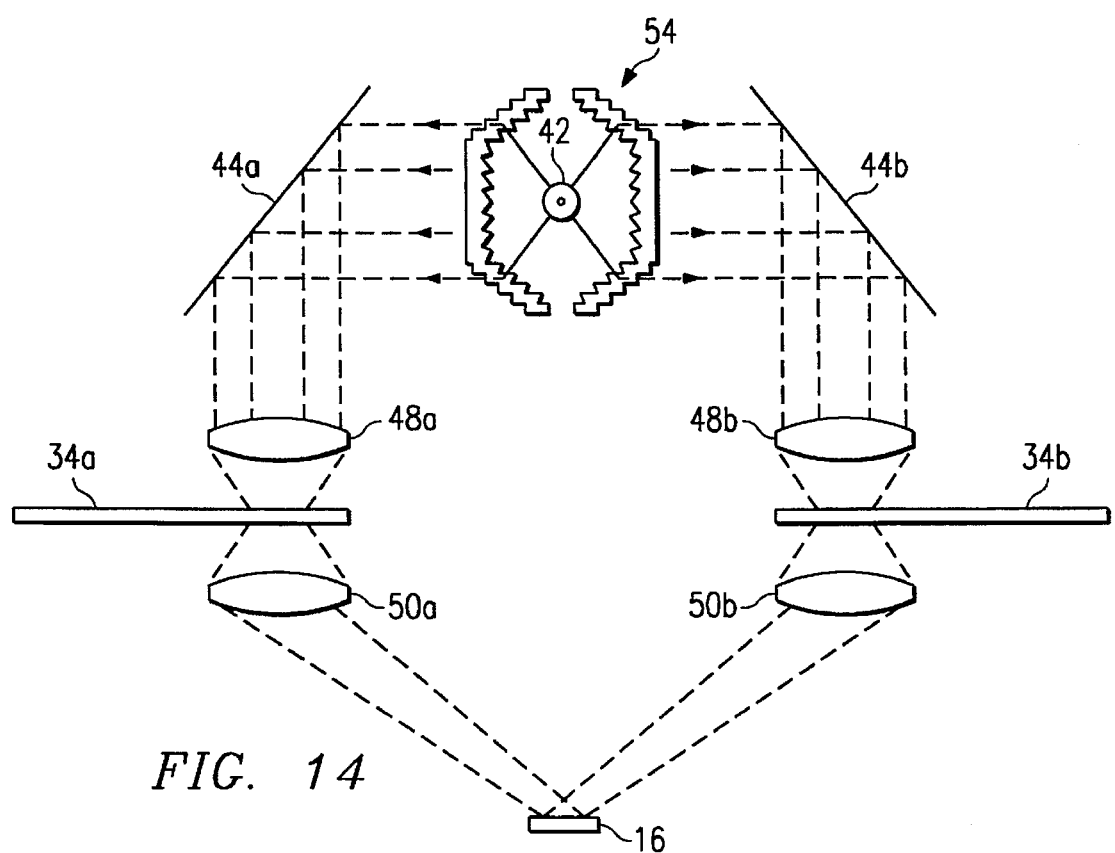
Figure 15:
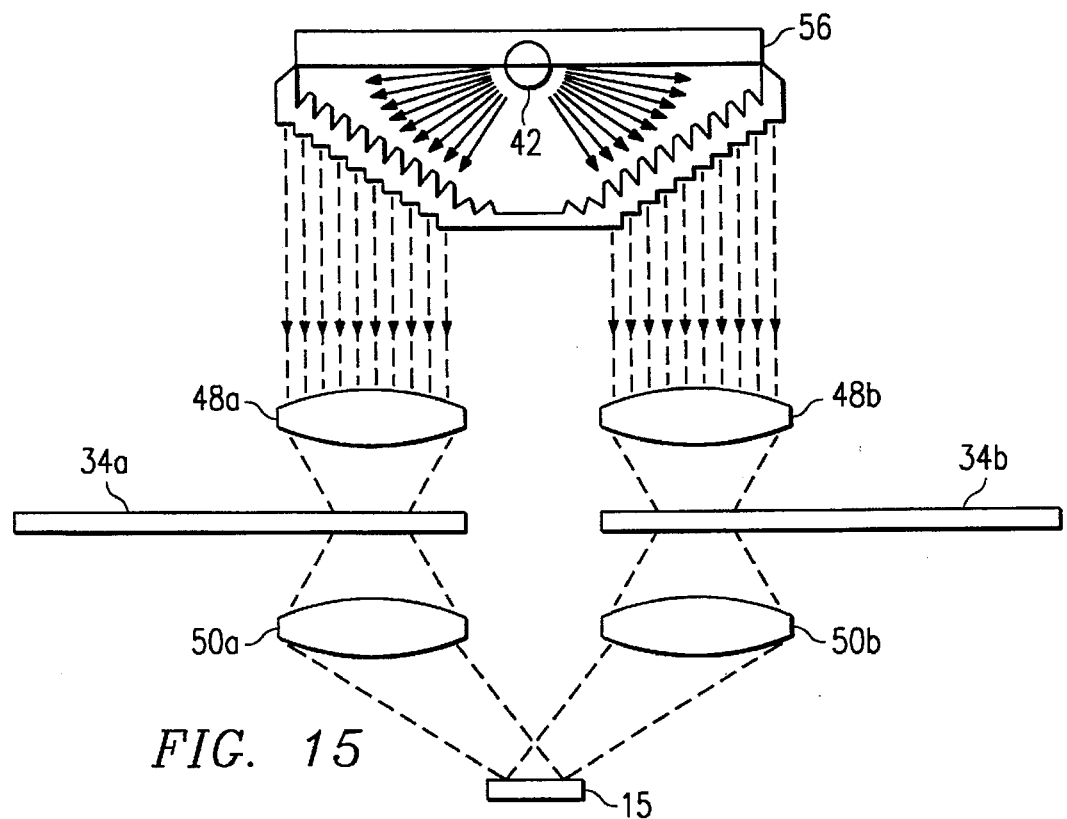

Another method of splitting light into two separate collimated beams is to use a total internal reflection (TIR) collector structures as illustrated in the systems of FIGS. 13, 14 and 15. These structures collect light over a solid angle almost up to 2 Pi steradians (one hemisphere). The output is a pseudo collimated beam that can then be concentrated via a collector lens as illustrated in FIG. 12.

FIGS. 13, 14, and 15 illustrate systems which include three exemplary TIR collector structures. A collector with a co-axial configuration is illustrated in the structure 52 of FIG. 13. In this case, pseudo collimated beams with a circular extent will be generated. The TIR collector 54 of FIG. 14 is configured in a longitudinal configuration. As with the first case, pseudo collimated beam of circular extent will be generated.

FIG. 15 illustrates a system with yet another TIR collector structure 56 which will generate a collimated beam. A collector structure similar to that of FIG. 15 is disclosed in U.S. Pat. No. 4,337,759, incorporated herein by reference.

Figure 16:
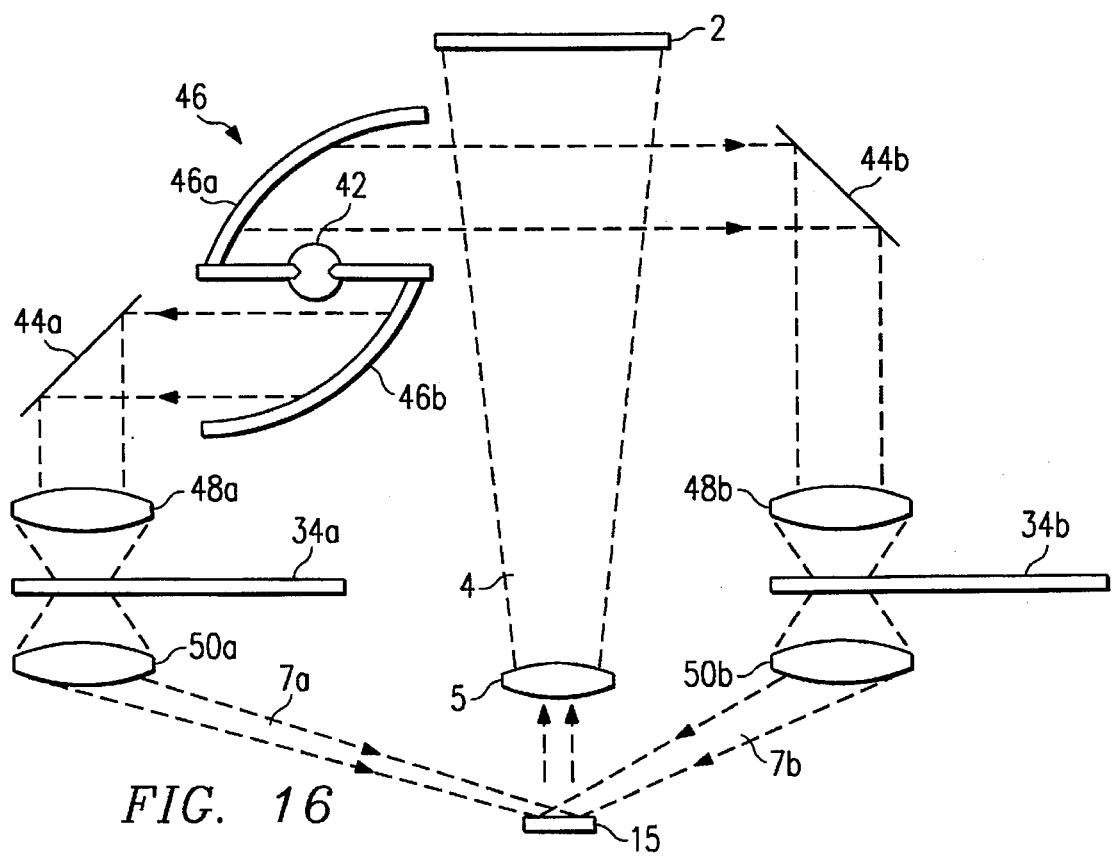
FIGS. 16-18 illustrate display systems which utilize the concept of the systems of the present invention.

Turning now to FIG. 16, a simplified display system is illustrated. As illustrated in the figure, light is reflected from spatial light modulator 15 toward screen 2. In order to accomplish this goal, several details must be considered. First, the light collector 46 must be positioned such that it does not obstruct light passing to screen 2 via light path 4.

In addition, magnifying projection lens 5 must be positioned far enough away from spatial light modulator 15 so that it is not within either light path 7a or 7b. Unfortunately, this problem is compounded by the fact that light path 7a/7b may impinge at an angle as high as 70° relative to the plane of spatial light modulator 15. In addition, magnifying lens projection 5 must be close to the spatial light modulator 15. In addition, magnifying projection lens 5 must be close to the spatial light modulator 15 so that the image directed from spatial light modulator may be magnified on screen 2. As an example, for a 52 inch diagonal screen, the distance between magnifying projection lens 5 and screen 2 must be 80 times greater than the distance between spatial light modulator 15 and magnifying projection lens 5. As a result, the distance between spatial light modulator 15 and magnifying projection lens 5 must be kept small in order to keep the size of the system reasonable.

Figure 17:
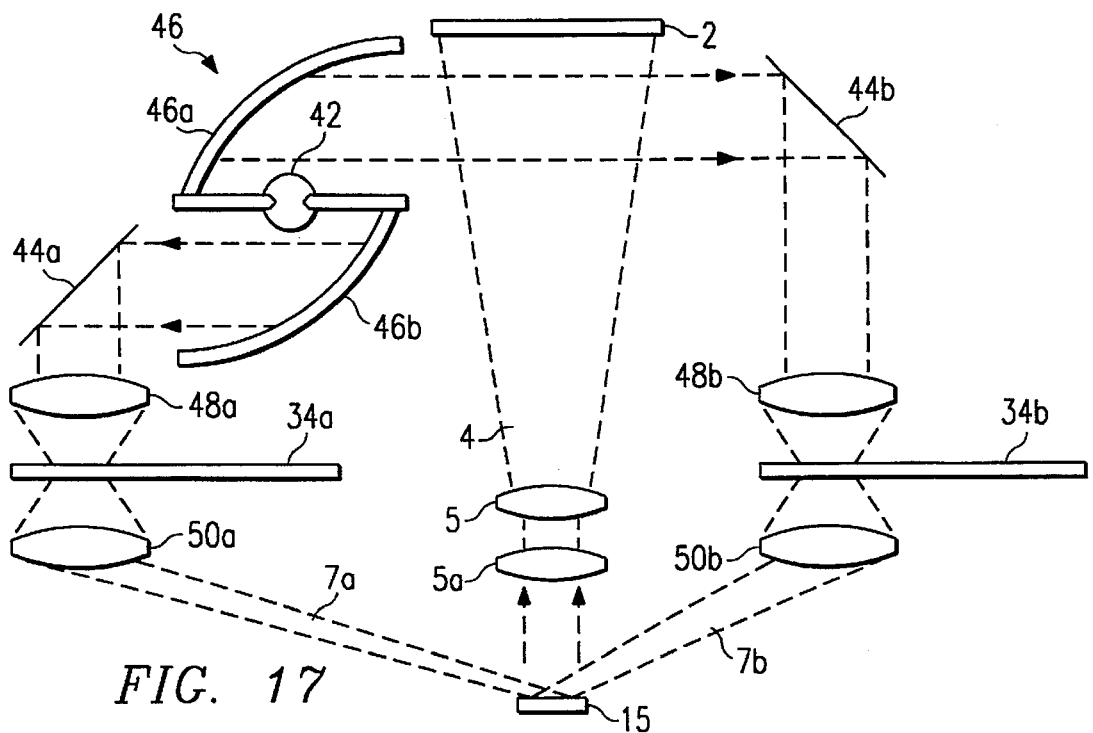

An embodiment which helps to minimize this problem is illustrated in FIG. 17. In this embodiment, a relay imaging lens 5a is included between spatial light modulator 15 and magnifying projection lens 5. In this embodiment, for the 51 inch screen, the distance between magnifying projection lens 5 and screen 2 must be 80 times greater than the distance between relaying and magnifying projection lens 5 and relay imaging lens 5a (rather than spatial light modulator 15). Therefore, the size of the system is kept to a minimum.

Figure 18:
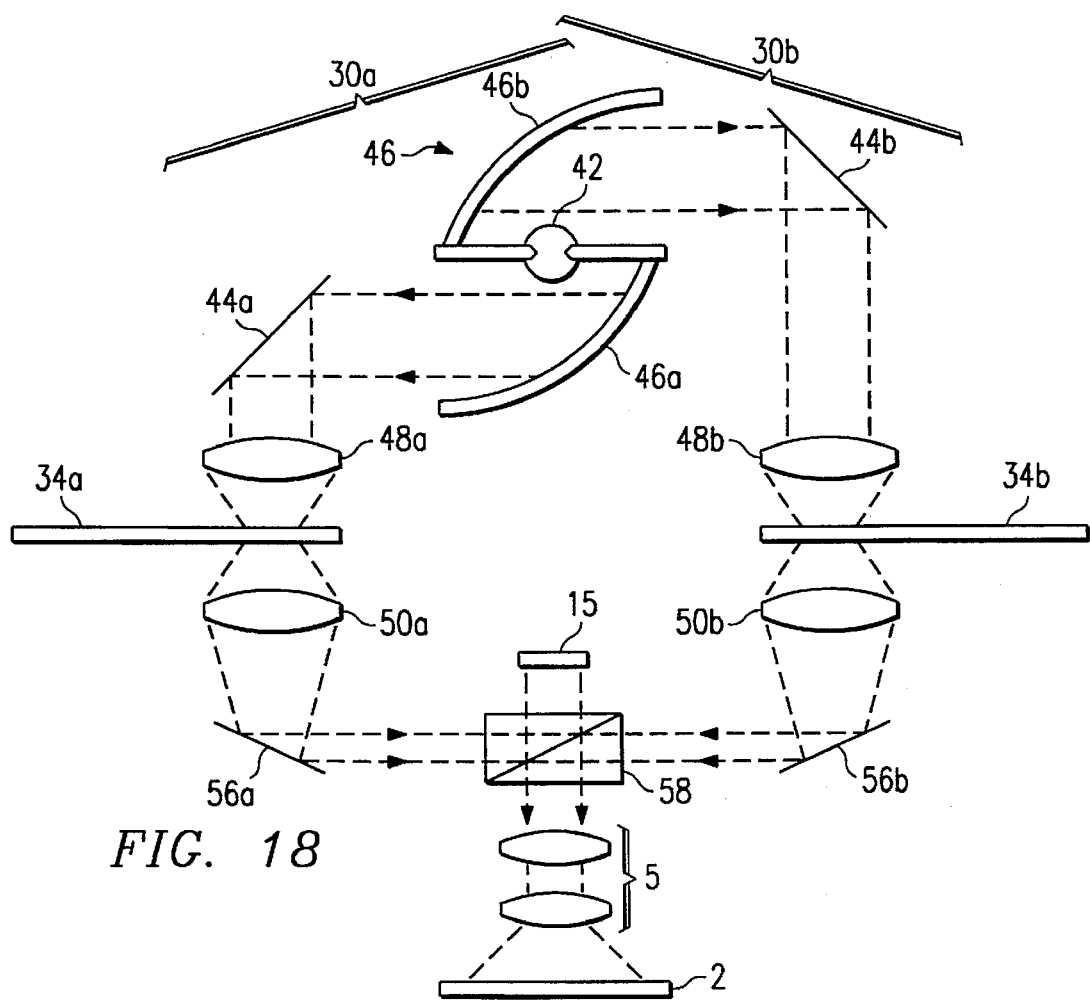

An alternate embodiment system is illustrated in FIG. 18. In this system, light from lens 50a and 50b is reflected from mirrors 56a and 56b, respectively, toward a total internal reflection (TIR) structure 58. The structure is designed such that light impinging from one side will be redirected at 90° while light impinging an adjacent side will be transmitted without deflection. So in this case, light from mirror 56a will be redirected within TIR structure 58 and travel to spatial light modulator 15 at the desired angle. After reflecting from spatial light modulator 15, the light will travel substantially straight through TIR structure to lens 5 and finally to screen 2.

If an asymmetric TIR structure 58 is used the system will be modified. In this context, an asymmetric TIR structure is one in which light will be redirected from one side but not from the opposite side. Referring again to FIG. 18 as an example, if TIR structure 58 was asymmetric, light reflected from mirror 56a would be redirected to SLM 16 but light reflected from mirror 56b would not. In these situations, the TIR structure 58 may be physically rotated so that some of the time it transmits light from mirror 56a and other times from mirror 56b. In this embodiment, a shutter(s) (not shown) may also be included and synchronized with the rotation of TIR structure 58 so that only light from one light generating apparatus 30a or 30b impinges the TIR structure 58.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical system for directing light to a spatial light modulator comprising:

a first light generating apparatus for generating a first beam of light;

a second light generating apparatus for generating a second beam of light;

a first lens for directing said first beam of light toward said spatial light modulator at a first angle;

a second lens for directing said second beam of light toward said spatial light modulator at a second angle different than said first angle; and means for redirecting one of said first and second beams of light away from said spatial light modulator.

2. The system of claim 1 wherein said first light generating apparatus comprises a first light source and said second light generating apparatus comprises a second light source.

3. The system of claim 1 wherein said first and second light generating apparatuses comprise a single source and a light dividing apparatus for generating said first and second beams of light.

4. The system of claim 3 wherein said light dividing apparatus comprises a first half-shell parabolic collector disposed near said single light source and a second half-shell parabolic collector disposed near said single light source.

5. The system of claim 3 wherein said light dividing apparatus comprises a total internal reflection collector.

6. The system of claim 1 wherein said first light generating apparatus comprises an arc lamp.

7. The system of claim 1 wherein said spatial light modulator comprises a deformable mirror device.

8. The system of claim 1 wherein said spatial light modulator comprises:

a plurality of pixels, each of said pixels including a deflectable beam, an address electrode adjacent said beam, and a landing electrode adjacent said beam;

wherein a voltage applied between said beam and said address electrode deflects said beam toward said address electrode, and said landing electrode is located to contact said beam deflected toward said address electrode and prevent said deflected beam from contacting said address electrode.

9. The system of claim 1 wherein said spatial light modulator comprises:

a plurality of pixels formed in a layered structure;

said layered structure including an insulated substrate, a spacer layer on said substrate, a conductive reflecting layer on said spacer layer, and a plurality of addressing and landing electrodes;

each of said pixels including
a deflectable element formed in said reflecting layer and connected to the remainder of said reflecting layer by at least one hinge formed from said reflecting layer,
a well formed in said spacer layer and extending from said deflectable element to said substrate,
a first addressing electrode on said substrate at the bottom of said well and located to deflect said deflectable element by electrostatic attraction, and
a first landing electrode on said substrate at the bottom of said well, said first landing electrode located both to contact said deflectable element when said deflectable element is deflected by attraction by said first addressing electrode to said substrate and to prevent said deflectable element from contacting said addressing electrode.

10. The system of claim 1 and further comprising a first color wheel for filtering said first beam of light and a second color wheel for filtering said second beam of light.

11. The system of claim 10 wherein said first and second color wheels comprise a single color wheel.

12. A method of displaying images represented by a digital signal, said method comprising the steps of:

generating first and second beams of light;

directing said first beam of light to a spatial light modulator, said first beam impinging said spatial light modulator at a selected angle;

providing said digital signal to said spatial light modulator;

selectively controlling pixel elements within said spatial light modulator in response to said digital signal;

redirecting a modulated version of said directed beam of light from said spatial light modulator toward a display;

displaying images represented by said digital signal on said display; and repeating said directing, providing, selectively controlling, redirecting and displaying steps for second beam of light wherein said second beam of light impinges said spatial light modulator at a second angle different than said selected angle.

13. The method of claim 12 wherein said selected angle is a selected number of degrees from a plane normal with said spatial light modulator and said second angle is the negative of said selected number of degrees from said plane normal with said spatial light modulator.

14. The method of claim 12 wherein said spatial light modulator comprises a digital micro-mirror device.

15. A display system comprising:

a first light generating apparatus for generating a first beam of light;

a second light generating apparatus for generating a second beam of light;

a first lens for directing said first beam of light toward said spatial light modulator at a first angle;

a second lens for directing said second beam of light toward said spatial light modulator at a second angle different than said first angle;

means for redirecting one of said first and second beams of light away from said spatial light modulator such that only one of said first and second beams impinge said spatial light modulator, said impinging beam reflecting from said spatial light modulator; and a display screen receiving said reflected beam.

16. The system of claim 15 wherein said first and second light generating apparatuses comprise a single source and a light dividing apparatus for generating said first and second beams of light.

17. The system of claim 16 wherein said light dividing apparatus comprises a first half-shell parabolic collector disposed near said single light source and a second half-shell parabolic collector disposed near said single light source.

18. The system of claim 16 wherein said light dividing apparatus comprises a total internal reflection collector.

19. The system of claim 15 wherein said display comprises the display of a television.

* * * * *